March 25, 1930. T. TOWLE 1,751,957
AIRPLANE WING CONSTRUCTION
Filed July 5, 1929
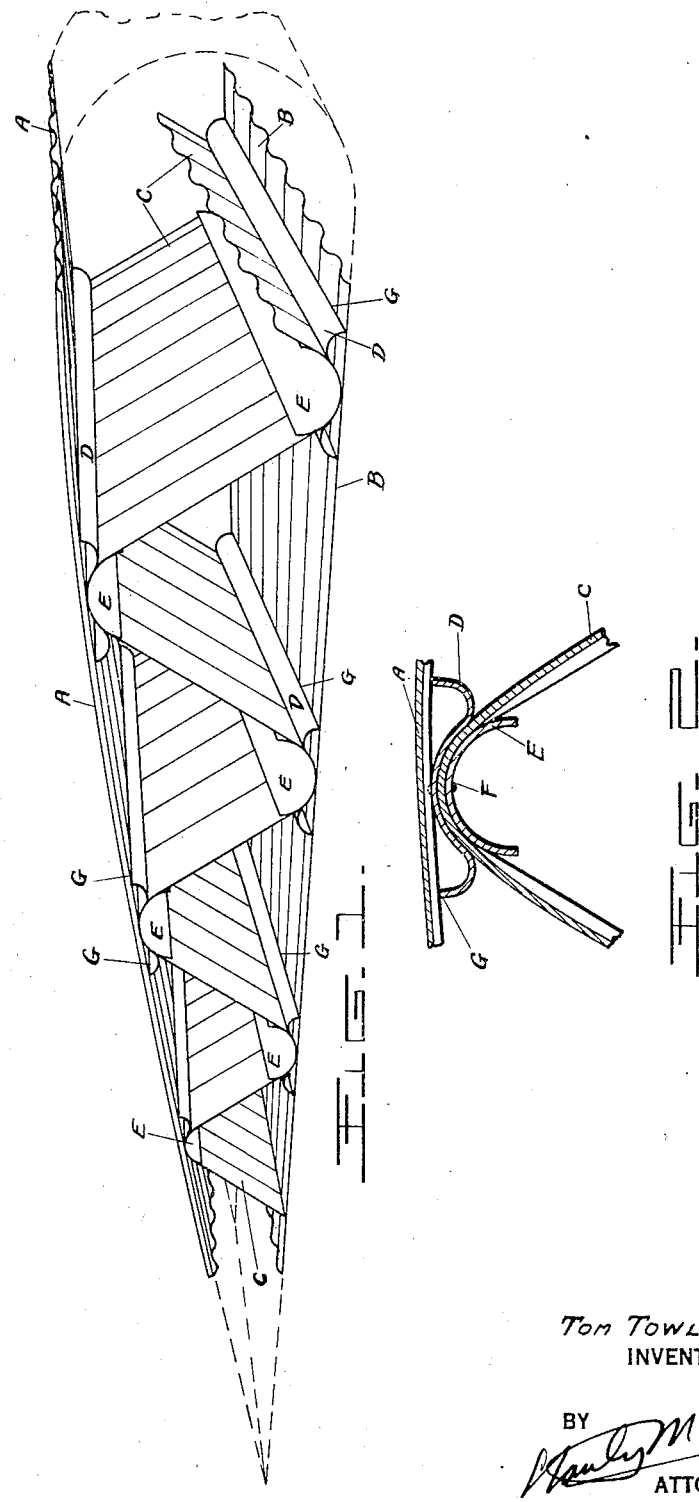
Tom Towle
INVENTOR
BY
ATTORNEY Patented Mar. 25, 1930

1,751,957

UNITED STATES PATENT OFFICE

TOM TOWLE, OF DETROIT, MICHIGAN, ASSIGNOR TO THE TOWLE AIRCRAFT COMPANY, OF DETROIT, MICHIGAN, A CORPORATION OF MICHIGAN

AIRPLANE-WING CONSTRUCTION

Application filed July 5, 1929. Serial No. 375,972.

This invention relates to an improved airplane wing construction.

Figure 1, is a diagrammatic perspective view of a portion of the wing.

Figure 2, is a cross sectional elevation illustrating the detail of construction which is the feature of this invention.

In the figure A is the upper skin covering of the wing which consists in corrugated sheet metal preferably "Alclad" duralumin with a thickness of .012" when used for a wing measuring seven feet from the leading to the trailing edges.

B is the lower skin covering of the same material and thickness. C is a stiffening sheet, also of the same material and thickness which is bent to form with the upper and lower skin covering A B a girder like structure which combines maximum strength and stiffness with minimum weight.

This corrugated sheet C has its corrugations flattened out along the lines where it comes in contact with the upper and lower skin A B as shown in Figure 2. At such places two reinforcing strips or stringers D and E are provided. The inner stringer E is formed of a segment of a duralumin tube 1½ inch outside diameter having a wall thickness of 0.162". The outer stringer D is corrugated and has a wall thickness of .095". The corrugations G in the stringers D give 3 lines of support to the skin A B and these enable a thinner material to be used than would be otherwise possible.

E conforms to the shape of C and D conforms to that of both C and A. The sheet C is thus closely locked between the strips E and D but the strip D engages with the skin covering A at the bottom of the corrugations in A at which point A C D and E are all riveted together by means of the rivet F, Figure 2.

What I claim is:—

1. An all metal airplane wing comprising an upper and lower skin covering of corrugated sheet material having the corrugations parallel to the line of flight a stiffening sheet interposed between said skins dividing the space there-between into triangular wedge shape portions, said stiffening sheet having corrugations also parallel to the line of flight reinforcing stringers at the lines of contact between the stiffening sheet and the outer skin.

2. An all metal airplane wing comprising an upper and lower skin covering of corrugated sheet material having the corrugations parallel to the line of flight a stiffening sheet interposed between said skins dividing the space there-between into triangular wedge shape portions, said stiffening sheet having corrugations also parallel to the line of flight reinforcing stringers at the lines of contact between the stiffening sheet and the outer skin, the corrugations of the stiffening sheet being removed where it engages with said outer skin.

3. An all metal airplane wing comprising an upper and lower skin covering of corrugated sheet material having the corrugations parallel to the line of flight a stiffening sheet interposed between said skins dividing the space there-between into triangular wedge shape portions, said stiffening sheet having corrugations also parallel to the line of flight reinforcing stringers between the stiffening sheet and the outer skin the corrugation of the stiffening sheet being removed where it engages with said outer skin a second set of reinforcing stringers engaging only with the flattened portions of the stiffening sheet.

4. An all metal airplane wing comprising an upper and lower skin covering of corrugated sheet material having the corrugations parallel to the line of flight a stiffening sheet interposed between said skins dividing the space there-between into triangular wedge shape portions, said stiffening sheet having corrugations also parallel to the line of flight, reinforcing stringers between the stiffening sheet and the outer skin, corrugations in said stringers so as to engage with and support said outer skin.

5. An all metal airplane wing comprising an upper and lower skin covering of corrugated sheet material having the corrugations parallel to the line of flight a stiffening sheet interposed between said skins and folded so as to divide the space there-between into triangular wedge shape portions, said stiffening sheet having corrugations also parallel to the line of flight, reinforcing stringers between the stiffening sheet and the outer skin, corrugations in said stringers so as to engage with and support said outer skin, an additional series of reinforcing stringers located within and supporting the folds of the stiffening sheet.

6. An all metal airplane wing comprising an upper and lower skin covering of corrugated sheet material having the corrugations parallel to the line of flight a stiffening sheet interposed between said skins and folded so as to dived the space there-between into triangular wedge shape portions said stiffening sheet having corrugations also parallel to the line of flight reinforcing stringers located within and supporting the folds of the stiffening sheet.

In testimony whereof he affixes his signature.

TOM TOWLE.